Feb. 8, 1966    G. N. KLEES ETAL    3,234,453
OVERLOAD PROTECTION FOR D.C. POWER SUPPLY WITH LOAD CURRENT
INTERRUPTED UPON OVERLOAD CONDITIONS
Filed Aug. 18, 1961    2 Sheets-Sheet 1

INVENTORS
GEORGE N. KLEES
WILLIAM A. BEMENT
BY  ROBERT W. HARPER

Edward A. Sokolski
ATTORNEY

INVENTORS
GEORGE N. KLEES
WILLIAM A. BEMENT
BY ROBERT W. HARPER

*Edward A. Sokolski*

ATTORNEY

United States Patent Office 3,234,453
Patented Feb. 8, 1966

3,234,453
OVERLOAD PROTECTION FOR D.C. POWER SUPPLY WITH LOAD CURRENT INTERRUPTED UPON OVERLOAD CONDITIONS
George N. Klees, La Habra, William A. Bement, Long Beach, and Robert W. Harper, Whittier, Calif., assignors to North American Aviation, Inc.
Filed Aug. 18, 1961, Ser. No. 132,459
2 Claims. (Cl. 323—22)

This invention relates to an overload protection circuit for D.C. power supply and more particularly to such a circuit which will respond to a predetermined overload to disconnect the power source from the load and will automatically reconnect the power source to the load when the overload condition is removed.

To avoid damage to electronic equipment, it is necessary to provide some means for disconnecting the power source from the load where a short circuit occurs or where there is a temporary or permanent overload due to some other circumstances. In most situations, this end result is achieved by either utilizing appropriate fuses or an overload relay. The drawback of these types of protective means is that they generally require either a replacement of the fuse or the resetting of the overload relay to restore normal operation when the overload condition has ceased. This has decided disadvantages where the overload is intermittent in nature. Further, in situations where it is impossible for personnel to get the equipment to reset the fuse or reset the overload relay such as for example an unmanned missile, situations may be encountered where the overload condition has disappeared and yet the equipment is completely disabled.

The device of this invention provides means which will instantaneously respond to overload conditions to effectively disconnect the power source from the load yet will automatically restore the power to the load at any time that the overload condition is not present. Hence, the equipment is protected against overload but is not completely incapacitated in situations where the overload condition is intermittent. Normal operation is obtained during any intervals that the overload condition is not present. It is therefore an object of this invention to provide an improved overload protection circuit.

It is a further object of this invention to provide an overload protection circuit which will disconnect the power source from the load when overload conditions are encountered and will automatically reconnect the source to the load when the overload condition disappears.

It is still another object of this invention to provide overload protection for electronic equipment without complete disablement of the equipment in situations of intermittent overload.

It is still a further object of this invention to provide a simple overload protection circuit which can readily be incorporated into a regulated power supply.

Other objects of this invention will become apparent from the following description taken in connection with the accompanying drawings of which:

Figure 2:
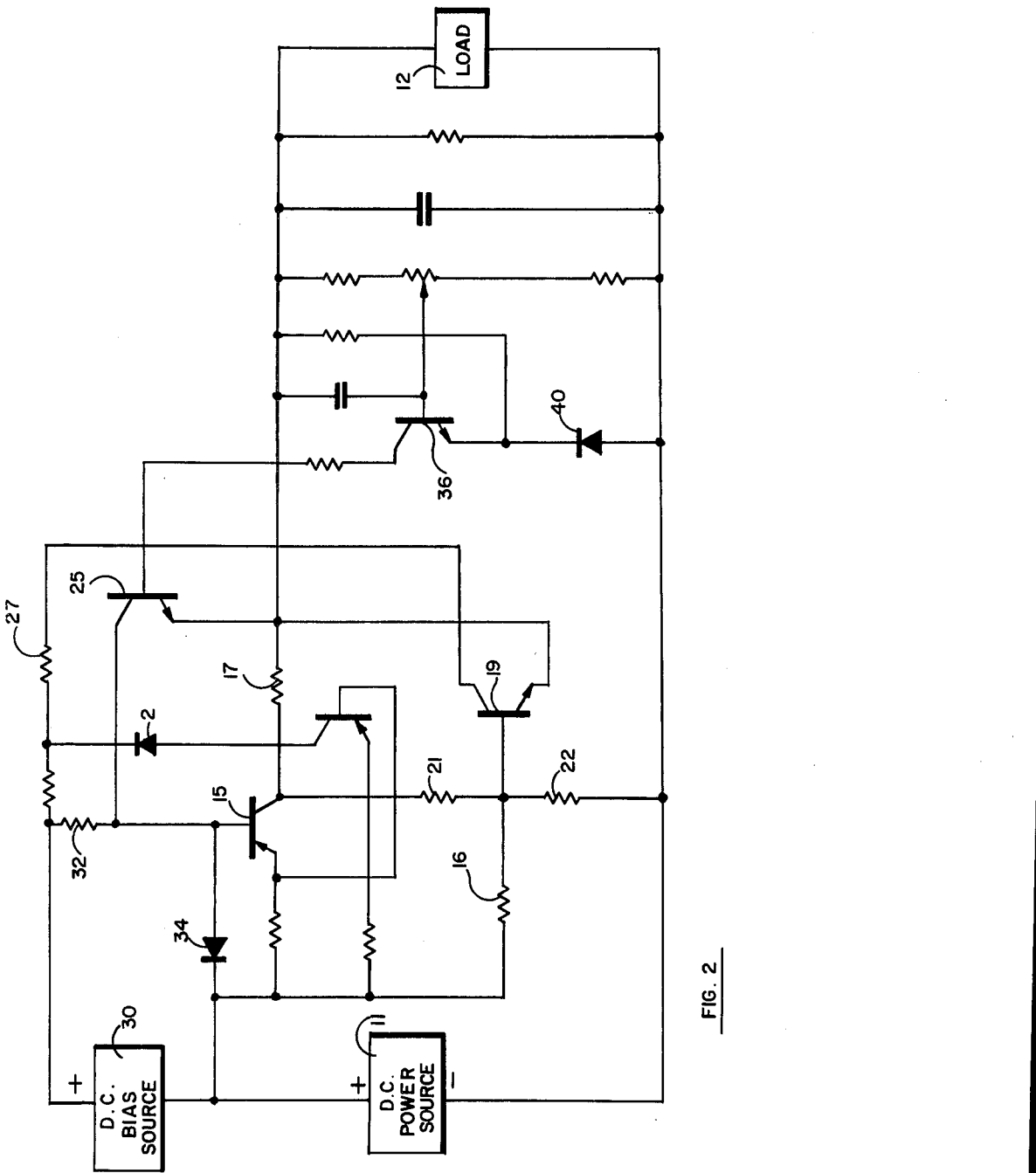
FIG. 2 is a schematic diagram of the device of the invention as incorporated into a regulated power supply.

The device of this invention can readily be incorporated into a regulated power supply such as that shown in Patent No. 2,984,779 entitled Transistorized Voltage Regulated Power Supply, G. N. Klees, inventor, patented May 16, 1961. The device of this invention, while it may be utilized in other types of regulated power supplies, for exemplary purposes, is illustrated in FIG. 2 as incorporated into the device of the aforementioned patent.

Figure 1:
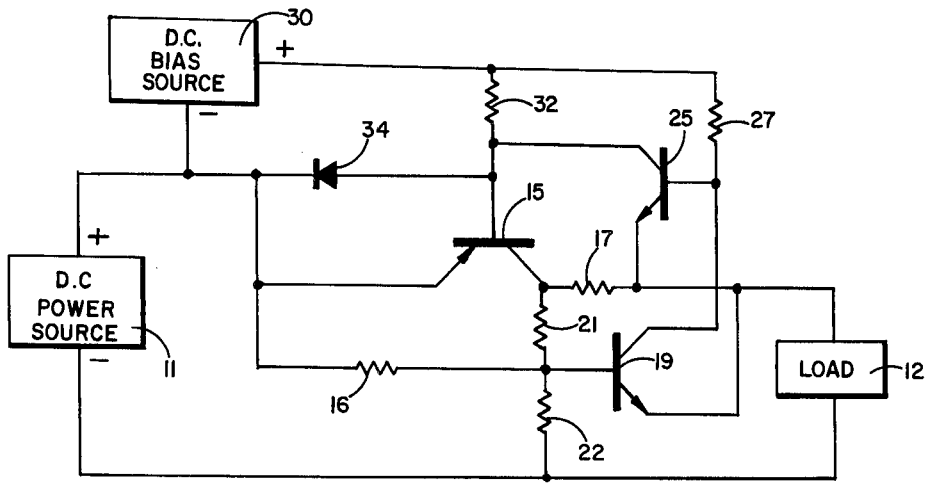
FIG. 1 is a simplified schematic diagram of the device of the invention.

Referring now to FIG. 1, a simplified schematic diagram of the device of the invention is shown. Power is supplied from power source 11 to load 12 through a path which includes, the emitter-collector path of transistor 15 and resistor 17. Transistor 19, under normal operating conditions, is back biased so it is held substantially at cutoff by means of the voltage divider comprising resistors 21 and 22. The collector of transistor 19 is connected to the base of transistor 25. With transistor 19 substantially cut off, transistor 25 is forward biased to conduction in the active region by means of bias source 30 which is connected to the base thereof through resistor 27. The collector of transistor 25 is connected to the base of transistor 15. Therefore, with transistor 25 conducting in the active region, transistor 15 is likewise forward biased to conduction in the active region in view of the fact that under such conditions, the voltage appearing at the base of transistor 15 will be substantially the voltage appearing at the emitter of transistor 25 which is the voltage at the positive terminal of load 12. This voltage, of necessity, will be negative with respect to that appearing at the emitter of transistor 15 which is connected in the circuit closer to power source 11. Thus, under normal operating conditions the current path from source 11 to load 12 will be closed to supply normal load current.

If the load curent should be increased, however, due to a short circuit or other malfunction, the current through resistor 17 will increase. This will produce an increase in the voltage drop across this resistor. Resistor 17 is connected between the emitter and base of transistor 19. Therefore the voltage drop across this resistor will affect the bias on transistor 19. When the load current exceeds a predetermined amount, the voltage drop across resistor 17 will be sufficient to forward bias transistor 19 to conduction in the active region. The conduction of transistor 19 is accelerated by means of a positive feedback path which includes resistor 16 connected between the positive terminal of power source 11 and the base of transistor 19. Transistor 19 for proper operation should be so back biased that for the worst condition of overload, i.e. for the condition where load 12 is completely short-circuited, transistor 19 will be forward biased to conduction high in the active region but below the saturation level.

With transistor 19 conducting heavily in the active region, the base-emitter junction of transistor 25 will be effectively short-circuited in view of the fact that the emitter of transistor 19 and 25 are connected together and the collector of transistor 19 is connected to the base of transistor 25. Such short-circuiting of the base emitter junction of transistor 25 will effectively cut off any significant current flow in this transistor. As has been already indicated, transistor 15 is normally forward biased by virtue of the voltage fed thereto from the collector of transistor 25 which with transistor 25 conducting is essentially the voltage at the emitter of this transistor. With transistor 25 cut off however, transistor 15 is back biased by the voltage fed thereto from D.C. bias source 30 through resistor 32.

Therefore under predetermined overload conditions, transistor 15 is effectively cut off to prevent any significant current flow from D.C. source 11 to load 12. Under short circuit conditions, the only current passed from power source 11 to load 12 will be the leakage current of transistor 15 which is relatively small.

It is to be noted that the transistors each act as current control means having a control electrode which is the base and a pair of output electrodes which are the emitter and collector.

Diode 34 which is connected between the base and emitter of transistor 15 is utilized to limit the bias between the base emitter junction of transistor 15 to a safe value for the protection of this transistor.

The various circuit parameters shown in FIG. 1 can be designed to effect a cut off of current flow between the source and the load for any predetermined overload condition. The moment the overload condition is removed, it can readily be seen that with a decrease of the voltage drop across resistor 17 that transistor 19 will return to its normal back biased condition and transistor 25 and 15 will be restored to a conductive state.

Referring now to FIG. 2, the device of the invention as incorporated into a transistorized voltage regulated power supply is shown. The regulator portion of the circuit shown in FIG. 2 is essentially the same circuit described in the aforementioned patent to Klees. The operation of the regulator portion of this circuit is fully described in the Klees patent. In FIG. 2, like parts to those shown in the simplified schematic of FIG. 1 bear like numerals. It should be noted that transistors 15 and 25 perform the dual functions of voltage regulation and overload protection.

As explained in aforementioned Patent No. 2,984,779, sensing transistor 36 operating in conjunction with voltage reference source 40, which may as indicated comprise a zener diode, is used to detect variations in the output voltage across the load 12 and such sensed variations are appropriately amplified and fed to control the current flow through transistor 15 so as to maintain the voltage across load 12 constant. Bias source 30 is utilized to provide fixed bias for both current regulation and overload protection functions. If an overload occurs, transistor 19 will operate to cut off transistor 25 which in turn cuts off transistor 15 as explained with reference to FIG. 1. As the operation of the current regulating portions of the circuit of FIG. 2 are thoroughly described in the aforementioned Klees patent, the description of such operation can be ascertained by reference to this patent and will not be repeated here.

As is obvious to one skilled in the art, the device of the invention can be designed using either NPN or PNP type transistors for the various function required. This circuit can also be readily incorporated into any type of transistorized regulated supply and is not limited to the specific circuit illustrated in FIG. 2.

The device of this invention thus provides a simple yet highly effective circuit for providing overload protection for a D.C. power source in which normal operation is automatically restored upon removal of the overload. While the device of this invention has been described and illustrated in detail, it is to be clearly understood that this is by way of illustration and example only and is not to be taken by way of limitation, the spirit and scope of the invention being limited only by the terms of the appended claims.

We claim:
1. A transistorized overload protection circuit for cutting off substantially all current flow from a power source to a load when the impedance of said load falls below a predetermined value comprising a first transistor connected with its emitter-collector path between said source and said load, a second transistor, means for back biasing said second transistor, a third transistor, the emitters of said second and third transistors being connected to said load, the collector of said second transistor being connected to the base of said third transistor, impedance means connected to said second transistor for providing a signal thereto indicative of the current flow to said load, the collector of said third transistor being connected to the base of said first transistor means for back biasing said first transistor, and means for forward biasing said third transistor.

2. In a voltage regulated power supply having a current control transistor interposed in the circuit path between the power supply and a load, an overload protection current comprising a first transistor, means for back biasing said first transistor, a second transistor, means for forward biasing said second transistor, and impedance means connected in the current path between the supply and the load for sensing the current flow therebetween, said impedance means being connected between the emitter and base of said first transistor, the emitter and collector of said first transistor being connected between the emitter and base of said second transistor, the collector of said second transistor being connected to the base of said current control transistor, whereby when the current between the power supply and the load exceeds a predetermined value said current control transistor is biased to cut off.

References Cited by the Examiner
UNITED STATES PATENTS

| | | | |
|---|---|---|---|
| Re. 24,715 | 10/1959 | Short | 323—22 X |
| 2,809,301 | 10/1957 | Short | 290—50 |
| 2,888,633 | 5/1959 | Carter | 323—22 |
| 2,912,635 | 11/1959 | Moore | 322—25 |
| 2,974,270 | 3/1961 | Christiansen | 323—22 |
| 3,117,273 | 1/1964 | Magnusson | 323—22 |

LLOYD McCOLLUM, *Primary Examiner.*
ROBERT C. SIMS, *Examiner.*